Nov. 19, 1957 J. E. WOODS 2,813,680
CONTROL SYSTEMS
Filed Feb. 12, 1952
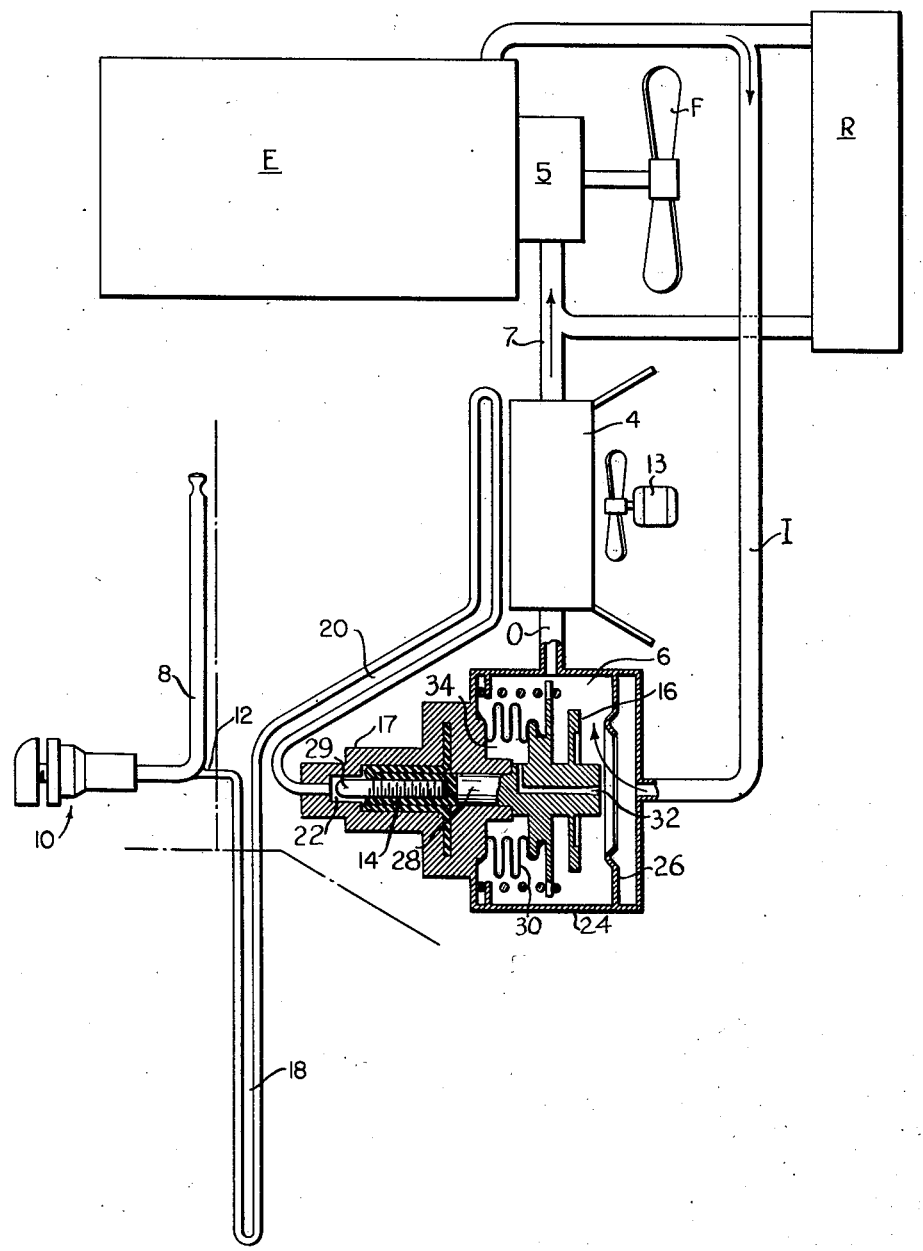
INVENTOR
JOHN E. WOODS
BY *Kenway Jenney*
*Walter F Hildreth*
ATTORNEYS

2,813,680

Patented Nov. 19, 1957

2,813,680

CONTROL SYSTEMS

John E. Woods, Cohasset, Mass., assignor to Standard-Thomson Corporation, Boston, Mass., a corporation of Delaware Application February 12, 1952, Serial No. 271,217

2 Claims. (Cl. 236—37)

The present invention relates to control systems and more particularly to controls for space heater units.

A common form of automotive heater uses a heat exchanger having tubes to carry hot water from the automotive cooling system, together with a fan or other unit for blowing fresh air over the coils and under the cowl into the body of the car. The flow of hot water through the coils is controlled by a valve which in turn is controlled by a thermostat suitably located in the body of the car. This system has been found to have two disadvantages. First, in extremely cold weather the car body thermostat may not call for sufficient heat to keep pace with the loss of heat through the windows and walls. Second, under moderately cool conditions, say at temperatures in the neighborhood of 40–50° F. when only a relatively small amount of heat is required to maintain the car body at its desired temperature, drafts of cold air may be introduced into the front part of the body by reason of the fact that the incoming fresh air passes over unheated coils of the heater.

The object of the present invention is to provide a simple and effective heater control by which the foregoing disadvantages may be eliminated.

With this object in view the present invention comprises a heating system involving the use of heater coils and a hot water control valve, together with a thermostatic control connected to the control valve. The thermostatic assembly is preferably a liquid-filled system, in which a bulb, a capillary and a seal member are completely filled with liquid. In addition the capillary includes one or both of the following temperature-compensating members: first, a member which is subjected directly to the ambient temperature and may be conveniently disposed beneath the fender, and second, a member disposed immediately at the air outlet of the heater and responsive to air below a certain minimum temperature. The compensating members may be conveniently in the form of loops in the capillary; by their use the extreme cold condition is compensated and the draft condition is eliminated.

The accompanying drawing is a diagram of the preferred form of heat control system according to the present invention.

The system shown in the drawing comprises the circulating hot water heater 4 connected with the water pump 5 of an engine E, the heater having a control valve indicated generally at 6. The engine has the usual radiator R and fan F. A pipe I connects from the top of the radiator to the inlet side of the valve 6. A pipe O connects from the outlet side of the valve to the heater. A pipe 7 leads from the heater to the pump 5. Disposed in any convenient part of the body of the vehicle is a thermostat comprising a liquid-filled bulb member 8. The thermostat has a manual adjusting member 10 as a means of setting for the desired temperature. A capillary tube 12 leads out of the bulb toward the valve 6. A fan 13 is used to circulate air through the heater 4 past the capillary and into the body of the car.

The valve 6 may be of any suitable form. As shown it is of the type shown in my copending application Serial No. 271,218, filed February 12, 1952, and includes a flexible and resilient rubber telescoping diaphragm 14 capable of transmitting the motion due to expansion of the thermostatic liquid directly to the movable valve member 16. The seal member is enclosed in a cup-like casing 17. Alternatively, the capillary may control a pilot valve, such as shown in my copending application, Serial No. 271,216, filed February 12, 1952, now Pat. No. 2,771,265, or a switch operating a booster pump to operate the valve 16 in the manner more completely disclosed in my copending application, Serial No. 178,457, filed August 9, 1950, now Pat. No. 2,656,114.

The capillary tube 12 is formed with two or more compensating portions indicated as loops 18 and 20. The loop 18 is external to the vehicle and is preferably disposed in any suitable position where it is responsive to the ambient temperature. It may be conveniently let out through the side of the vehicle and supported in any suitable manner under one of the front fenders of the car. This loop is responsive to the ambient temperature and therefore serves to change the control point, when the outside temperature is low, so that additional heat is supplied to the interior of the vehicle to compensate for the increased heat loss.

The loop 20 is utilized for draft suppression and is placed immediately at the hot air outlet of the heater.

The bulb 8, the capillary 12 and the cup portion 17 of the valve 6, and of course the loops 18 and 20 are completely filled with a thermostatic liquid. Therefore the portions 18 and 20 are temperature-responsive in the same manner as the bulb portion 8.

Referring more specifically to the details of the valve 6, the cup portion 17 comprises a casing which defines a channel 22 and has an extension 24 in which is supported a seat member 26. The valve member 16 has a stem portion 28 slidably received in the channel. A pin member 29 lies coaxially with the valve stem in the channel. The rubber diaphragm member 14 consists of a closed end abutting the stem, an inner portion overlying the pin member and an outwardly folded portion confined within and secured at its extremity to the wall of the channel. A flexible corrugated bellows member 30 is secured at one end to a flange on the valve member 16 and at the other end to the cup portion 17. The valve member has a hole 32 leading from the space 34 inside the bellows to the face of the valve. Thus when the valve is closed the pressure on its face is opposed by the equal pressure inside the bellows.

The loop 20 is subject to the air entering the vehicle and hence if the air is excessively cool, the heater valve will be opened to admit hot water and thereby introduce additional heat into the entering air stream. This condition arises mainly under moderately cool temperature conditions, say in the neighborhood of 40–50°, since the heater may not be called on by the bulb 12 to operate sufficiently to prevent the entrance of drafty cool air. This is to be distinguished from very cold conditions where the heater is supplied with hot water for a sufficient portion of time to prevent the cool drafts. The invention therefore provides for the elimination of undesirable conditions both under extreme cold and moderately cold conditions.

Having thus disclosed my invention, I claim:

1. A temperature controlled valve including the combination of a casing having a valve seat and defining a channel aligned therewith, a valve member having a stem slidably received in the channel, a flexible member defining a space communicating with the side of the valve opposite to its face, an opening leading from said space to the valve face, a pin member lying coaxially with the valve stem in said channel, a thermostatically-responsive bulb, a single continuous capillary communicating with the bulb and with the channel adjacent the pin, the bulb and capillary being completely filled with a temperature-responsive liquid, and a tubular diaphragm member having a closed end abutting said stem, an inner portion overlying said pin member and an outwardly folded portion confined within and secured at its extremity to the wall of the channel, said diaphragm member being arranged to fold within itself upon motion of the valve stem relative to the channel with said outwardly folded portion remaining fully confined by said channel.

2. In a heating system including a circulating-liquid heater, a temperature controlled valve for the heater including the combination of a casing having a valve seat and defining a channel aligned therewith, a valve member having a stem slidably received in the channel, a flexible member defining a space communicating with the side of the valve opposite to its face, an opening leading from said space to the valve face, a pin member lying coaxially with the valve stem in said channel, a thermostatically-responsive bulb, a single continuous capillary communicating with the bulb and with the channel adjacent the pin, the bulb and capillary being completely filled with a temperature-responsive liquid, the capillary having a loop responsive to ambient temperature and a loop disposed at the outlet of the heater, and a tubular diaphragm member having a closed end abutting said stem, an inner portion overlying said pin member and an outwardly folded portion confined within and secured at its extremity to the wall of the channel, said diaphragm member being arranged to fold within itself upon motion of the valve stem relative to the channel with said outwardly folded portion remaining fully confined by said channel.

References Cited in the file of this patent

UNITED STATES PATENTS

| | | |
|---|---|---|
| 985,146 | Clorius | Feb. 28, 1911 |
| 1,964,745 | Sauzedde | July 3, 1934 |
| 1,971,532 | McAuley | Aug. 28, 1934 |
| 2,164,882 | Miles | July 4, 1939 |
| 2,262,496 | Hobbs et al. | Nov. 11, 1941 |
| 2,293,947 | Persons | Aug. 25, 1942 |
| 2,490,919 | Raney | Dec. 13, 1949 |
| 2,534,251 | Dillman | Dec. 19, 1950 |
| 2,534,497 | Albright | Dec. 19, 1950 |
| 2,593,238 | Albright | Apr. 15, 1952 |
| 2,636,776 | Vernet | Apr. 28, 1953 |
| 2,673,038 | Vernet et al. | Mar. 23, 1954 |

FOREIGN PATENTS

| | | |
|---|---|---|
| 600,610 | France | Nov. 14, 1925 |